Sept. 11, 1951  S. R. WINETT  2,567,794

DENTAL COMPRESSION CLAMP

Filed Sept. 28, 1950

Inventor

Sidney R. Winett

By Clarence A. O'Brien
and Harvey B. Jacobson
Attorneys

Patented Sept. 11, 1951

2,567,794

UNITED STATES PATENT OFFICE 2,567,794

DENTAL COMPRESSION CLAMP

Sidney R. Winett, Westfield, N. J.

Application September 28, 1950, Serial No. 187,302

9 Claims. (Cl. 32—63)

1

This invention relates to novel and useful improvements in a dental compression clamp and more particularly in a clamp to be easily applied to the teeth of a patient and to exert continuous and sustained pressure on the impression or restoring material, without attention by the dentist, for the setting or hardening of said material.

It is a further object of the invention to devise a mold clamp for the teeth with an offset adaptation for insertion in those difficult positions behind the cheek as in the restoring of the molar teeth.

An important aim is to provide such a device as to facilitate restoring several teeth from either or both sides simultaneously.

Yet another intention of the invention is to provide a dental clamping device whereby an impression of a cavity in a tooth may be taken which requires an inlay.

Another principal object of the invention is to provide in the sustained pressure arrangement, such motion of the clamping parts as to compensate under the maintained pressure for such shrinking of plastic restoring materials as occur during their setting, condensation or polymerization and to maintain such pressure as to eliminate voids, internal strains as in wax as it congeals, to increase the strength of plastics, and provide a better surface to resist the action of the mouth fluids to avoid staining or weakening the exposed surfaces of the restoration.

These together with numerous other objects of invention, which will become later apparent as the following description proceeds, are attained by my device, a preferred embodiment of which has been disclosed in the accompanying drawings, wherein the same numerals designate similar parts in the several views and wherein.

2

Figure 4:
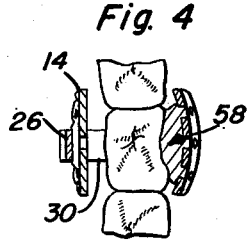
Figure 4 is a section taken on plane generally indicated by section line 4—4 of Figure 3, showing the clamping parts immediate to the teeth.
Figure 5:
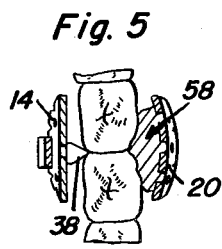
Figure 5 is a similar view to that of Figure 4, showing a modification of the detent spring when applied between teeth.
Figure 7:
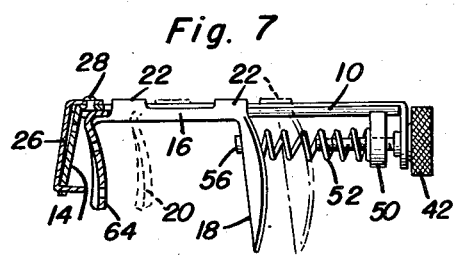
Figure 6:
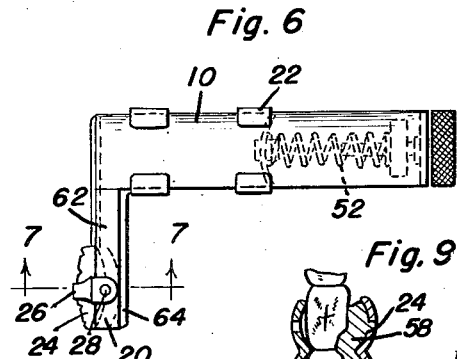
Figure 6 is a top plan view of a modification of the invention, in particular of an offset for use behind the cheek, showing in dashed lines the internal structure including the spring, and spring tension adjusting lock nut.
Figure 9:
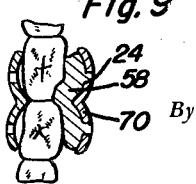
Figure 8:
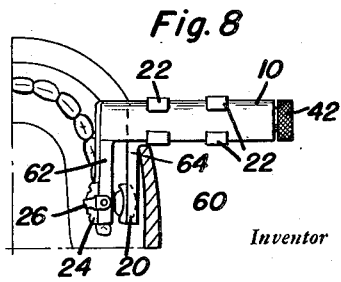

Figure 7 is a partial vertical longitudinal section taken substantially on the plane indicated approximately by the section line 7—7 of Figure 6, showing in dashed lines the clamp in retracted position;

Figure 8 is a top plan view of the modified device shown in Figure 6, applied to molar teeth, the mouth and cheek of the patient being shown in horizontal section;

Figure 9 is a view similar to Figures 4 and 5, showing a modification of the application of the device adapted especially for taking an impression or restoring two teeth.

Figure 1:
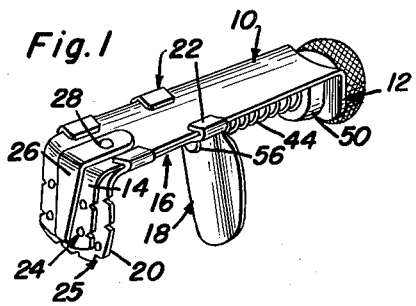
Figure 1 is a perspective view of the assembled clamp of the invention.
Figure 2:
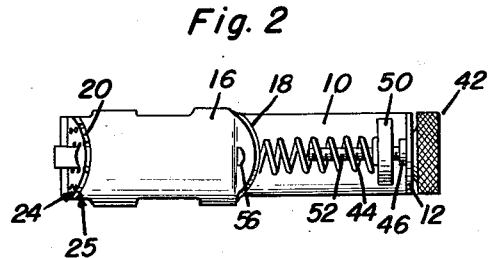
Figure 2 is a bottom plan view of the device.

Referring now more specifically to Figures 1 and 2, 10 denotes the body of the device, of rigid material, shown in the drawings of arched cross-section, for greater strength, and concaved upward, having flanges bent downward at each end, indicated at the handle end by 12, and at the tooth clamping end by 14. Flange 14 is designed to be inserted in the mouth and to rest generally on or near the inner surface of the teeth. On the underside of the body and in slidable engagement therewith, is a clamp 16, having two vertically depending flanges, comprising a finger grip 18, and a tooth clasping portion 20. The slidable engagement is provided by clips 22, arranged suitably at four points and bent upward and over the body portion to allow lengthwise sliding of the clamp on the body. The handle is convexly curved and adapted for comfortable gripping by the fingers.

The tooth clasping flange portion 20 is spoon-shaped with its hollow surface presented toward the other adjacent flange 14 of the body, forming in the hollows between the clasping flanges and the tooth what are technically known as trays, that toward the tongue being designated the lingual tray, and that on the lip or cheek side of the tooth as the labial tray, both being designed to hold molding or impression retaining material as will be explained later hereinafter.

Figure 3:
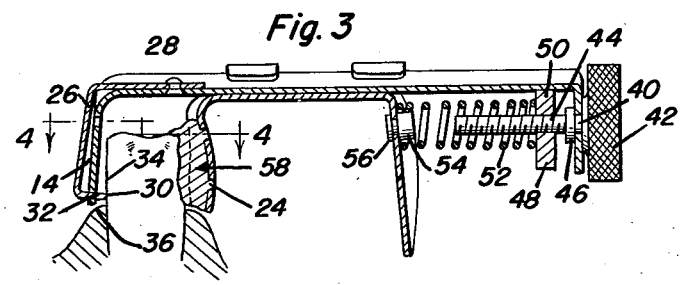
Figure 3 is a longitudinal vertical section of the device in application to the teeth and gums.

Perforations 24 and notches 25 in the two cooperating flanges 14 and 20, are provided for better grasping the wax or other molding or impression receiving material clasped by the members against the teeth. On the treatment end, or left end of Figures 1 and 3 of the body is shown the attached spring detent 26, a generally right angled spring, riveted as at 28 to the body, extending on the flange 14, and having a tooth bearing end 30, passing over the end of flange 14 or through notch 32 in its bottom edge, bent to bias against the inner tooth surface 34, near the patient's gum edge or gingival border 36.

Figure 4 shows the details of this relation to the tooth and gum in application, and Figure 5 shows a modification by suitable shaping as by making pointed the detent designated as 38, for between teeth positioning.

On the handle end of the body 10, and through the flange 12 thereon, by means of aperture 40, is inserted a screw adjustment consisting of the knurled handle 42 and integrally connected threaded bolt stem 44. Retaining the screw stem in the apertures is collar 46, fixed as by a pressed fit on the unthreaded portion of the bolt stem, near the head 42. Adjusting nut 48 is threaded on the bolt stem, and is adapted at its top edge 50 to slide closely against the under surface of the body 10, but of sufficient width of bearing surface presented to the body to prevent its rotation with respect thereto as head 42 and its screw length is rotated within the adjusting nut. Extending on the screw stem is the compression spring 52, one end biasing against the adjusting nut 48, and the other end against the finger grip 18, and received over the rivet or boss provided on grip 18, at 54, and whose head is shown at 56. The spring is of such length and strength as to bias the grip, and the whole sliding clamp away from the adjusting nut and the handle end of the body, toward the outer surface of the tooth or impression material 58 clasped thereon. The sliding action may be better understood from Figure 7 showing two positions of the sliding clamp, the modification therein being hereinafter described. As may be seen the spring and adjustment arranges for holding the impression material, or plastic filling material against the tooth as is done by much cruder means, as is customary in the art of tooth impression, making and of plastic filling.

The advantages of the device are obvious in the process of clamping a wax or other impression material against the teeth and cavities therein; to form a matrix or mold on the teeth to be restored, and then to exert spring pressure on the filling material as it sets without the attention of the dentist for readjustment after the device is once applied; the sustained spring pressure upon an excess of material, as of plastics, compensating for the inherent shrinkage of the same during setting or polymerization; providing superior esthetic qualities from the molding under pressure, with attendant greater surface hardness, strength and lack of pores to withstand chemical changes due to the action of the mouth fluids and likewise providing increased resistance to staining; and its adaptability to restoring several teeth simultaneously or to restore any part of the teeth.

That such a convenient device fills a real need, is realized when it is considered that the manufacturers of the new plastic filling materials recommend positive retention during an entire fifteen minute period, meanwhile regardless of vigorous lip, tongue or cheek movements by the patient.

In general and as will immediately occur to one skilled in the dental art the device is adapted for use in the following steps: one would proceed by grasping the device with the fingers on the slide grip, and with the knurled nut and the handle portion of the body in the palm of the hand; then filling the labial tray with softened dental molding material and pressing it upon the notched and perforated tray; inserting the clamping end into the patient's mouth, over the teeth, so that the spring detent 30 engages the inner surface of the tooth near the gum line of cervix; permitting the slides to slowly release, compressing the molding material against the labial side of the tooth; and securing an impression thereof. Thereafter the hand of the operator may be completely released from the device as it will be completely self-retaining. The compound may be chilled or otherwise hardened at will.

Likewise the lingual tray may be filled and an impression made on the lingual surface of the tooth, as may be obvious, or both impressions may be made simultaneously, as the two compound sections readily separate from each other. Alternatively the tooth cavity could have been temporarily filled with wax or gutta percha as is well known in the art, and the impression for a plastic pre-mold made, and that in turn used to make the actual permanent filling. But in general the cavity is filled with an excess of molding and filling material after suitable preparation of the tooth to receive same, and covered with thin tinfoil or thin moistened cellophane or plastic sheeting and the prepared matrix whose preparation was described in the previous paragraph, is replaced in the trays, and over the tooth, and clamped by release of the hand on the slide grip. Under the sustained pressure provided and which may be adjusted at will as herein before described, after sufficient time has elapsed for proper setting and hardening of the filling, the device is retracted from the mouth and the excess filling material removed. The procedure of the molding, pre-molding and restoring may be altered at will by those skilled in the art, with the considerable convenience provided by the invention.

Figures 6-9 show a modification of the invention for easy insertion within the cheek 60 of the patient by means of right and left offset extensions 62 of the body. The slide offset is correspondingly shaped and is seen at 64 in Figure 8. At the free end of the body offset depends flange 24 which is similar in every respect to those of the previously discussed form of the instrument shown in Figure 1 and where the spring detent 26 is riveted at 28 to the extension. Correspondingly flange 20 is attached to or is integral with the slidable offset 64, Figure 8 showing it in retracted position. Guide clips 22 engage the slide to the body, and the extension 64 slides under the stationary offset 64, the closed position of the slide extension being shown in dotted lines of Figure 6. At the end of the slide extension is the vertical flange, carrying the spoon-shaped trays exactly as in the other form. Similarly the fixed flange carries the detent 26, held by rivet 28. The adjustment is by knurled nut 42, as in the other form.

The use of the modification is obvious but its apparent advantages are manifold. Its easy placement inside the cheek, shown as 60 in Figure 8, without stretching the cheek from the jaw, solves a major and difficult problem. Figure 9 shows an adaptation of the labial and lingual trays for restoration involving two or more teeth. This modification, while being especially useful in work on molar teeth is useful as well on the other teeth. It involves replacement of the flanges or reshaping them into bow shaped members 70, to simulate the division of the teeth in the molding material. It is also valuable in those situations where large clasping surfaces are needed, and where the small spring detent is inadequate for that purpose. They bear the usual perforations 24 and notches 25 and clasp the restoring material 58 against the cavity as shown. Other adaptations have been tested, such as large shell shaped trays enclosing fully a large tooth.

From the foregoing it will be seen that the principles of the invention are adapted to a variety of uses and may be employed in diverse ways, and accordingly it is not intended to limit the invention to the exact construction shown and described, but all suitable modifications and equivalents may be resorted to falling within the scope of the appended claims.

Having described the invention, what is claimed as new is:

1. A dental clamp for taking impressions, and molding restorations to teeth comprising a body adapted for holding in the operator's hand, a clamp for clasping the teeth at one end and a clamp tensioning adjustment means at the other end, said clamp comprising a flange on the end of said body, a flange slidable on said body to clasp the tooth therebetween, said flange on the end of said body having a spring detent at its end for resiliently contacting the tooth.

2. The combination of claim 1, wherein said clamp flanges are spoon-shaped and adapted to enclose restoring or impression material against the surfaces of the teeth.

3. A dental clamp for taking impressions, and molding restorations to teeth comprising a body adapted for holding in the operator's hand, a clamp for clasping the teeth at one end and a clamp tensioning adjustment means at the other end, said clamp comprising a flange on the end of said body, a flange slidable on said body to clasp the tooth therebetween, said clamp flanges being spoon shaped and adapted to enclose restoring or impression material against the surface of the teeth, said flange on the end of said body having a spring detent at its end for resiliently contacting the tooth.

4. The combination of claim 3, wherein said flanges are provided with notches and perforations to retain the restoring material, said clamps embracing a plurality of teeth, and holding the restoring or impression material on both the front and rear of said teeth, and between and over several teeth for a simultaneous repair.

5. The combination of claim 1, wherein said clamp tensioning adjustment comprises a spring biased between the handle end of said body and one face of said clamp.

6. The combination of claim 1, wherein said clamp is arranged on a right angled offset adapted for engaging said clamp on the molar teeth behind the cheek.

7. A dental clamp for taking impressions, and molding restorations to teeth comprising a body adapted for holding in the operator's hand, a clamp for clasping the teeth at one end and a clamp tensioning adjustment means at the other end, said clamp being arranged on a right angled offset adapted for engaging said clamp on the lower teeth behind the cheek, said clamp consisting of two flanges biased toward each other, said flanges having notches and perforations to retain the restoring material and holding the restoring material over both front and rear of said teeth, and between and over several teeth for simultaneous repair, one of said flanges having a spring detent at its end for resiliently contacting the teeth.

8. The combination of claim 1, wherein said clamp comprises a flange on the end of said body and a flange slidable on said body to clasp the tooth therebetween, said slidable flange comprising a finger grip, a compression spring biasing said slidable flange toward said fixed flange, said spring bearing against said slidable flange at said finger grip.

9. The combination of claim 1, wherein said clamp comprises a flange on the end of said body and a flange slidable on said body to clasp the tooth therebetween, said slidable flange comprising a finger grip, a compression spring biasing said slidable flange toward said fixed flange, said spring bearing against said slidable flange at said finger grip, said compression spring being adjusted in pressure by and adjusting nut.

SIDNEY R. WINETT.

REFERENCES CITED

The following references are of record in the file of this patent:

UNITED STATES PATENTS

| Number | Name | Date |
|---|---|---|
| 734,072 | Laskey | July 21, 1903 |
| 1,106,815 | Hopkins | Aug. 11, 1914 |

FOREIGN PATENTS

| Number | Country | Date |
|---|---|---|
| 836,552 | France | Apr. 13, 1938 |